United States Patent
Ramireddy Gari et al.

(10) Patent No.: US 12,536,171 B2
(45) Date of Patent: Jan. 27, 2026

(54) FAST LOAD OF DASHBOARDS USING DATA CACHING

(71) Applicant: ServiceNow, Inc., Santa Clara, CA (US)

(72) Inventors: Dastagirireddy Ramireddy Gari, Hyderabad (IN); Oriol Arbonés, Remote (CH); Wellington Avelino Dos Santos, Amsterdam (NL); Marko Marić, Amsterdam (NL); Willian Wilmar Cieslak, Amsterdam (NL); Subramani Thandayuthapani Prabhakaran, Amsterdam (NL); Olga Sergiyivna Redkina, Amsterdam (NL)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 18/680,719

(22) Filed: May 31, 2024

(65) Prior Publication Data
US 2025/0371002 A1 Dec. 4, 2025

(51) Int. Cl.
 *G06F 16/2453* (2019.01)
 *G06F 16/23* (2019.01)
 *G06F 16/2458* (2019.01)
(52) U.S. Cl.
 CPC .... *G06F 16/24539* (2019.01); *G06F 16/2393* (2019.01); *G06F 16/24532* (2019.01); *G06F 16/2471* (2019.01)

(58) Field of Classification Search
 CPC ......... G06F 16/24539; G06F 16/24532; G06F 16/2471; G06F 16/2393
 See application file for complete search history.

(56) References Cited

U.S. PATENT DOCUMENTS

| | | | |
|---|---|---|---|
| 10,417,243 B1 | 9/2019 | Singh et al. | |
| 10,970,303 B1* | 4/2021 | Denton | G06F 16/951 |
| 11,461,347 B1* | 10/2022 | Das | G06F 16/2433 |
| 2015/0112998 A1* | 4/2015 | Shankar | G06F 16/248 |
| | | | 707/798 |
| 2016/0162535 A1* | 6/2016 | Peterson | G06F 16/2282 |
| | | | 707/696 |
| 2020/0334254 A1* | 10/2020 | Arye | G06F 16/2393 |
| 2024/0152535 A1* | 5/2024 | Zacharia | G06F 40/30 |
| 2025/0061113 A1* | 2/2025 | Thomas | G06F 16/24549 |

FOREIGN PATENT DOCUMENTS

| | | | | |
|---|---|---|---|---|
| CN | 115438279 A | * | 12/2022 | ......... G06F 16/9538 |
| CN | 116561460 A | | 8/2023 | |

OTHER PUBLICATIONS

International Search Report and Written Opinionf for PCT Application No. PCT/US2025/031014 dated Oct. 2, 2025.

* cited by examiner

*Primary Examiner* — Huawen A Peng
(74) *Attorney, Agent, or Firm* — FLETCHER YODER PC

(57) ABSTRACT

Systems and methods disclosed herein for improving data retrieval for dashboards using data caching. The system may implement a cache memory to store results for executed queries and/or anticipated queries, allowing for data to be retrieved asynchronously, and may implement a request queue to distribute the queries among processing nodes.

19 Claims, 6 Drawing Sheets

FAST LOAD OF DASHBOARDS USING DATA CACHING

TECHNICAL FIELD

The present disclosure relates to accelerated retrieval of requested information from a database and providing the requested information to a graphical user interface (GUI).

BACKGROUND

A dashboard is a type of customizable graphical user-interface (GUI) that concurrently presents various information in a single display. For example, a dashboard may include multiple tiles, where each tile includes a visual representation of a particular data set. Currently, whenever a user accesses a dashboard, the system executes a database query using a processing node to retrieve the various data sets needed to populate the dashboard. Thus, when many users attempt to access the system for many dashboards at the same time, the system may experience significant slowdowns due to the high number of queries and limited number of processing nodes to handle the queries.

SUMMARY

One aspect of the disclosure includes a method for identifying data access in a data table and generating an access policy to the data table. The method may include obtaining, from a cache memory of database, a data table comprising a plurality of entries and a plurality of key values, each entry of the data table comprising a respective key value. The method may further include receiving a first query for data from the database and generating, based on the first query, a first key. The method may further include determining that the first key does not match any key value of the plurality of key values of the data table. The method may further include executing, at the database, the first query to obtain first query results and storing the first query results at the data table along with the first key value. The method may further include applying the first access policy and the second access policy receiving a second query for data from the database; generating, based on the second query, a second key; determining that the second key matches a particular key value of the data table; and in response to determining that the second key matches the particular key value of the data table, returning, as second key results to the second query, the corresponding entry of the data table associated with the particular key value.

Implementations of the disclosure may include one or more of the following features. The method may include processing the first query at a first processing node; and processing the second query at a second processing node. The method may include adding the first query to a request queue before determining that the first key does not match any key value of the plurality of key values of the data table; and adding the second query to the request queue before determining that the second key matches a particular key value of the data table. The method may further indicate that determining that the second key matches a particular key value of the data table further comprises determining that an expiration condition of the data table is satisfied. The method may further indicate that executing the first query to obtain first query results comprises processing the first query at a first processing node while concurrently processing a third query to obtain third query results at a second processing node. The method may further include returning, as first key results to the first query, the first query results, wherein at least one of the first key results the second key results are returned asynchronously. The method may further indicate that at least one of the first query and the second query are batched queries comprising a plurality of queries corresponding to a dashboard graphical user interface (GUI) of a user. The method may further indicate the second key results are used to generate a data visualization shown on a dashboard to a user. The method may further include using a query execution module of the one or more processors to obtain the first query results. The method may further include storing the first query and the second query in a request queue. The method may further include returning, as first key results to the first query, the first query results. The method may further be performed by a server of a data center. The method may further include obtaining an expiration condition for each entry of the data table; determining that the corresponding entry of the data table associated with the particular key value is expired based, at least in part, on the expiration condition; and in response to determining that the corresponding entry has expired, executing, at the database, the second query to obtain second query results, replacing the corresponding entry with the second query results and an updated expiration condition, and returning, as second key results to the second query, the second query results. The method may further include, in response to determining that first key does match a key value of the plurality of the key values of the data table, returning, as first key results to the first query, the entry corresponding to the key value. The method may further indicate the first query and the second query are processed at different processing nodes of the computer system concurrently. The method may further indicate the particular key value of the data table that matches the second key is the first key value. The method may further indicate each entry of the data table further comprises respective query information, respective result information, and a respective expiration condition. The method may further indicate each entry of the data table further comprises an user-configurable expiration condition based, at least in part, on a predetermined date, a time duration, caching statistics, or a manual request.

Another aspect of the disclosure includes a system comprising one or more processors and a memory including computer-executable instructions. The one or more processors, when executing the computer-executable instructions, may cause the system to obtain, from a cache memory of database, a data table comprising a plurality of entries and a plurality of key values, each entry of the data table comprising a respective key value. The one or more processors may further cause the system to receive a first query for data from the database, generate, based on the first query, a first key, and determine that the first key does not match any key value of the plurality of key values of the data table. The one or more processors may further cause the system to execute, at the database, the first query to obtain first query results and store the first query results at the data table along with the first key value. The one or more processors may further cause the system to receive a second query for data from the database, generate, based on the second query, a second key, and determine that the second key matches a particular key value of the data table. The one or more processors may further cause the system to, in response to determining that the second key matches the particular key value of the data table, return, as second key results to the second query, the corresponding entry of the data table associated with the particular key value.

Implementations of the disclosure may include one or more of the following features. The one or more processors may further cause the system to process the first query at a first processing node; and process the second query at a second processing node. The one or more processors may further cause the system to add the first query to a request queue before determining that the first key does not match any key value of the plurality of key values of the data table; and add the second query to the request queue before determining that the second key matches a particular key value of the data table. The one or more processors may further cause the system to indicate that determining that the second key matches a particular key value of the data table further comprises determining that an expiration condition of the data table is satisfied. The one or more processors may further cause the system to indicate that executing the first query to obtain first query results comprises processing the first query at a first processing node while concurrently processing a third query to obtain third query results at a second processing node. The one or more processors may further cause the system to return, as first key results to the first query, the first query results, wherein at least one of the first key results the second key results are returned asynchronously. The one or more processors may further cause the system to indicate that at least one of the first query and the second query are batched queries comprising a plurality of queries corresponding to a dashboard graphical user interface (GUI) of a user. The one or more processors may further cause the system to indicate the second key results are used to generate a data visualization shown on a dashboard to a user. The one or more processors may further cause the system to use a query execution module of the one or more processors to obtain the first query results. The one or more processors may further cause the system to store the first query and the second query in a request queue. The one or more processors may further cause the system to return, as first key results to the first query, the first query results. The one or more processors may be a part of a server of a data center. The one or more processors may further cause the system to obtain an expiration condition for each entry of the data table; determine that the corresponding entry of the data table associated with the particular key value is expired based, at least in part, on the expiration condition; and in response to determining that the corresponding entry has expired, execute, at the database, the second query to obtain second query results, replace the corresponding entry with the second query results and an updated expiration condition, and return, as second key results to the second query, the second query results. The one or more processors may further cause the system to, in response to determining that first key does match a key value of the plurality of the key values of the data table, return, as first key results to the first query, the entry corresponding to the key value. The one or more processors may further cause the system to indicate the first query and the second query are processed at different processing nodes of the computer system concurrently. The one or more processors may further cause the system to indicate the particular key value of the data table that matches the second key is the first key value. The one or more processors may further cause the system to indicate each entry of the data table further comprises respective query information, respective result information, and a respective expiration condition. The one or more processors may further cause the system to indicate each entry of the data table further comprises an user-configurable expiration condition based, at least in part, on a predetermined date, a time duration, caching statistics, or a manual request.

Another aspect of the disclosure includes a non-transitory computer-readable storage medium having stored thereon executable instructions that are executable by one or more processors of a computer system. The computer-readable storage medium may include instructions to obtain, from a cache memory of database, a data table comprising a plurality of entries and a plurality of key values, each entry of the data table comprising a respective key value. The computer-readable storage medium may include instructions to receive a first query for data from the database, generate, based on the first query, a first key, and determine that the first key does not match any key value of the plurality of key values of the data table. The computer-readable storage medium may include instructions to execute, at the database, the first query to obtain first query results and store the first query results at the data table along with the first key value. The computer-readable storage medium may include instructions to receive a second query for data from the database, generate, based on the second query, a second key, and determine that the second key matches a particular key value of the data table. The computer-readable storage medium may include instructions to, in response to determining that the second key matches the particular key value of the data table, return, as second key results to the second query, the corresponding entry of the data table associated with the particular key value.

Implementations of the disclosure may include one or more of the following features. The computer-readable storage medium may include instructions to process the first query at a first processing node; and process the second query at a second processing node. The computer-readable storage medium may include instructions to add the first query to a request queue before determining that the first key does not match any key value of the plurality of key values of the data table; and add the second query to the request queue before determining that the second key matches a particular key value of the data table. The computer-readable storage medium may include instructions to indicate that determining that the second key matches a particular key value of the data table further comprises determining that an expiration condition of the data table is satisfied. The computer-readable storage medium may include instructions to indicate that executing the first query to obtain first query results comprises processing the first query at a first processing node while concurrently processing a third query to obtain third query results at a second processing node. The computer-readable storage medium may include instructions to return, as first key results to the first query, the first query results, wherein at least one of the first key results the second key results are returned asynchronously. The computer-readable storage medium may include instructions to indicate that at least one of the first query and the second query are batched queries comprising a plurality of queries corresponding to a dashboard graphical user interface (GUI) of a user. The computer-readable storage medium may include instructions to indicate the second key results are used to generate a data visualization shown on a dashboard to a user. The computer-readable storage medium may include instructions to use a query execution module of the one or more processors to obtain the first query results. The computer-readable storage medium may include instructions to store the first query and the second query in a request queue. The computer-readable storage medium may include instructions to return, as first key results to the first query, the first query results. The one or more processors may be a part of a server of a data center. The computer-readable storage medium may include instructions to obtain an expiration condition for each entry of the data table; determine that the corresponding entry of the data table associated with the particular key value is expired based, at least in part, on the expiration condition; and in response to determining that the corresponding entry has expired, execute, at the database, the second query to obtain second query results, replace the corresponding entry with the second query results and an updated expiration condition, and return, as second key results to the second query, the second query results. The computer-readable storage medium may include instructions to, in response to determining that first key does match a key value of the plurality of the key values of the data table, return, as first key results to the first query, the entry corresponding to the key value. The computer-readable storage medium may include instructions to indicate the first query and the second query are processed at different processing nodes of the computer system concurrently. The computer-readable storage medium may include instructions to indicate the particular key value of the data table that matches the second key is the first key value. The computer-readable storage medium may include instructions to indicate each entry of the data table further comprises respective query information, respective result information, and a respective expiration condition. The computer-readable storage medium may include instructions to indicate each entry of the data table further comprises an user-configurable expiration condition based, at least in part, on a predetermined date, a time duration, caching statistics, or a manual request.

BRIEF DESCRIPTION OF THE DRAWINGS

Various embodiments in accordance with the present disclosure will be described with reference to the drawings, in which.

DETAILED DESCRIPTION

Figure 1:
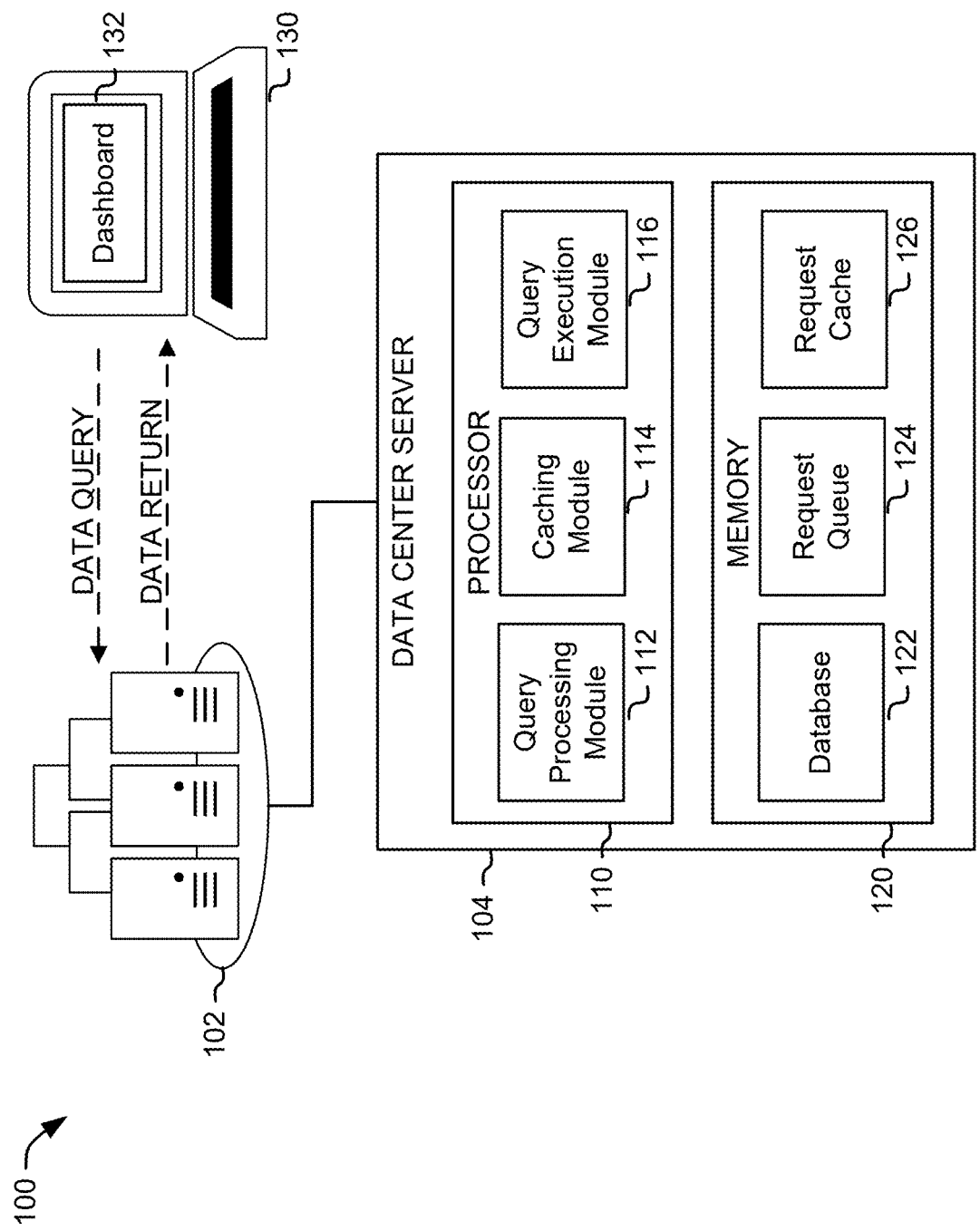
FIG. 1 illustrates a data retrieval and caching system, according to at least one embodiment.

In preceding and following descriptions, various techniques are described. For purposes of explanation, specific configurations and details are set forth in order to provide a thorough understanding of possible ways of implementing techniques. However, it will also be apparent that techniques described below may be practiced in different configurations without specific details. Furthermore, well-known features may be omitted or simplified to avoid obscuring techniques being described.

When many users attempt to access a system for data retrieval, a number of batched data queries or requests can grow large, particularly for systems that require constant updates of a graphical user interface (GUI), such as a software visual dashboard. In these cases, each batch may need to wait for the processing node to be available before executing the next batch. This causes a significant slowdown on the users' experience as they wait for their queries to be executed in order for their desired report to be displayed. This problem is exacerbated in particular when redundant database queries are queued (e.g., when different users request the same data) and when a single dashboard visualization includes a number of individual queries.

Thus, implementations herein are aimed at a system for improving data retrieval for dashboards. The system may implement a cache memory to store query results for executed queries and/or anticipated queries, allowing data to be retrieved for incoming queries without execution of the query. Further, the system may include a request queue to manage individual database queries. The request queue can organize incoming database queries, determine whether a query matches data in the cache, and/or transmits the query to a processing node for execution. By providing a cache memory and request queue as described here in some implementations, more queries can be handled in parallel and some queries can be handled without execution of the query, thus reducing the load on any individual processing node.

In some implementations, the request queue is associated with a plurality of server processing nodes, and when a user attempts to access a dashboard, the corresponding database queries are stored in the request queue. Then, the server uses a request queue to distribute the queries among the plurality of processing nodes for processing in order and in parallel. When a query is complete in a processing node, the retrieved data is output to the user and to a cache for storage. Then, the processing node is freed and a next query is processed. Later, when a query is received that is the same as a previous query, then the output data is retrieved from the cache instead of reprocessing/re-executing the query at the processing node.

In some implementations, the cache is implemented as a table in the database, with caching parameters controlled by user preferences set relative to the requested report or visualization. In those cases, the cache entries would be refreshed in or cleared from the table at intervals according to the preferences. For example, a user may set their dashboard such that a productivity metric visualization may be updated multiple times an hour, an employee timesheet visualization is updated once a day, and a cost metric visualization is updated only manually on demand.

The implementations described herein provide many advantages over known techniques. For example, implementations herein may enable webpages and dashboards with visualizations on them load faster. Further, other implementations may remove browser and semaphore bottlenecks that are present in the current architecture by moving visualization processing from the end client to the server. Additionally, implementations described herein may allow for distributed processing of the queries for data across multiple nodes, enabling processing of next operations in a queue while a current operation is still processing. Furthermore, implementations described herein reduce the number of unnecessary data queries to the data providers because often used database requests cached for future retrieval. Still other implementations may further enable more complex interactions with the charts possible, such as dynamically navigating a visualization, zooming in and out, displaying real-time signals, etc.

FIG. 1 illustrates a data retrieval and caching system 100, according to at least one embodiment. In at least one embodiment, system 100 comprises a data center server 104 of a data center 102. Data center server 104 comprises data processing hardware including a processor 110, comprising one or more processing nodes, and a memory 120. In at least one embodiment, data center server 104 includes a plurality of processors 110, each comprising one or more processors nodes and/or processing modules.

In at least one embodiment, a user at computing terminal 130 accesses a visual dashboard 132. The visual dashboard 132 may comprise a graphical user interface (GUI) that illustrates various data sets stored in a database in various visual representations (e.g., a line graph, pie chart, data table, power curve, text list, etc.) The visual dashboard 132 may comprise a plurality of modular tiles, where each tile can be modified to display a different data set in a customized preference. The data sets of the visual dashboard 132 may comprise results returned from a database query (also referred to herein as a "database request") and may be updated at regular timing intervals, threshold rules, or on demand.

In at least one embodiment, the computing terminal 130 and/or visual dashboard 132 requests data from a data center server 104 of the data center 102 in order to generate an appropriate visual representation for the user. The database query or database request may be manually generated and transmitted by a user or may be automatically generated and transmitted according to predefined time or threshold rules preset by a user or software.

In at least one embodiment, data center server 104 receives the database query or database request at a processor 110 of data center server 104. The processor 110 may be one or more processors and may comprise one or more processors, such as a graphics processing unit (GPU), general-purpose GPU (GPGPU), parallel processing unit (PPU), central processing unit (CPU)), a data processing unit (DPU), a part of a system on chip (SoC), or combination thereof. The processor 110 may comprise a plurality of processing nodes or processing cores that may each perform independent operations concurrently.

In at least one embodiment, processor 110 further comprises a query processing module 112. The query processing module 112 may receive the data query transmitted from the computing terminal 130 and/or visual dashboard 132 and store the query in request queue 124. The query processing module 112 may further generate a unique key corresponding to the database query, which is used to determine a method for retrieving and returning data in response to the query. The query processing module 112 may retrieve next queries in the request queue 124 distribute them for processing in parallel among the plurality of processing nodes of processor 110.

In at least one embodiment, processor 110 further comprises a caching module 114. The caching module 114 may retrieve results from or store results in request cache 126. In at least one embodiment, each result stored in request cache was obtained from database 122 in response to an earlier query execution performed by query execution module 116 and is stored with the query's unique key. The caching module 114 may receive a next query for processing from query processing module 112 and, if the unique key for the next query matches a unique key found in the request cache 126, then caching module 114 may return the corresponding stored results directly to the query processing module 112 without needing to execute the query or access the database 122. By obtaining and returning the results stored in request cache 126, multiple users may quickly retrieve the results of same queries without performing redundant query executions of the database.

In at least one embodiment, processor 110 further comprises a query execution module 116. The query execution module 116 may execute a query command (e.g., a SQL command) to search database 122 and capture the results of the execution. The results obtained from the query command may comprise information from the database 122 in memory 120 of the data center server 104 and/or comprise information obtained from external third-party sources, such as retrieved via API as incorporated into the query command. In at least one embodiment, query execution module 116 is only used when a cached result is not found in request cache 126. The captured results may then be returned to query processing module 112.

In at least one embodiment, caching module 114 may also comprise a cleaner that may remove or refresh expired or stale data stored in the request cache 126. In at least one embodiment, expired data that is determined not to be useful (e.g., as defined manually by a user, an software automation parameter, or as indicated by frequency of access) may be removed from request cache 126. In at least one embodiment, caching module 114 may refresh expired data that is determined to be useful by obtaining new database results to replace the expired data. In this case, caching module 114 may use query execution module 116 to re-execute the query corresponding to the expired data and overwrite the expired results with the new results in request cache 126.

In at least one embodiment, data center server 104 further comprises memory 120. Memory 120 may comprise non-volatile memory, volatile memory, or a combination thereof. Memory 120 may comprise a database 122, a request queue 124, and a request cache 126.

In at least one embodiment, database 122 stores an organized collection of information, including information relevant to a user or dashboard visualization. Database 122 may be controlled by a database management system (e.g., Oracle, SQL, Mongo, etc.) Database 122 may comprise stored information obtained from internal sources (e.g., client uploaded data or data from other terminals of data center 102) and/or from external third-party sources, retrieved via API on demand or pushed to database 122 via webhook listeners. In at least one embodiment, database 122 only comprises internal sourced data, and any external third-party data is only retrieved on demand via API through the database query and provided to the user and not permanently stored on the database 122.

In at least one embodiment, request queue 124 stores data requests or queries received by data center server 104 from various computing terminal(s) 130. The request queue 124 may be a first-in, first-out (FIFO) queue. The request queue 124 may be associated with a plurality of server processing nodes and a processor 110 (e.g., using query processing module(s) 112) may retrieve a request stored in the queue and distribute the request for processing in any of the associated processing nodes. In at least one embodiment, request queue 124 is implemented as a messaging queue. Each data request may be produced as a new message for the message queue. In an embodiment, new messages are only created for data requests that require a new query execution. In an embodiment, messages are distributed among any available processing node for processing.

In at least one embodiment, request cache 126 stores aggregated responses of recently executed database queries. Request cache 126 may be implemented as a table in the database, with caching parameters controlled by user preferences set relative to the requested dashboard report or visualization. Request cache 126 may include information including a unique key that identifies the request, information corresponding to the query request, results of the query execution, and/or expiration parameters. Expiration parameters may be a condition based on a predetermined date and time (e.g., June 24 at 2:00 AM), a duration (e.g., expired after 24 hours), a frequency at which the request cache is accessed, recent logins or dashboard updates, a manual request or any other parameter appropriate to the database and data being accessed. In at least one embodiment, when a cached entry expires, a new message for the messaging queue of request queue 124 is automatically generated for data refreshing.

In at least one embodiment, performing some or all of the processes of system 100 accelerates data retrieval by the computing terminal because results can be returned directly from the request cache, minimizing the number of search queries executed at the database. Performing some or all of the processes of system 100 can additionally reduce processing burdens because data can be retrieved asynchronously between the servers and the computing terminals. For example, the user at the computing terminal can quickly retrieve new data on the dashboard because the cache data has already been recently fetched in the background, instead of obtaining the data in direct response to the request.

In an embodiment, some or all of the processes of system 100 (or any other processes described, or variations and/or combinations of those processes) may be performed under the control of one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process of system 100 may be performed by any suitable system, such as the computing device 600 of FIG. 6.

Figure 2:
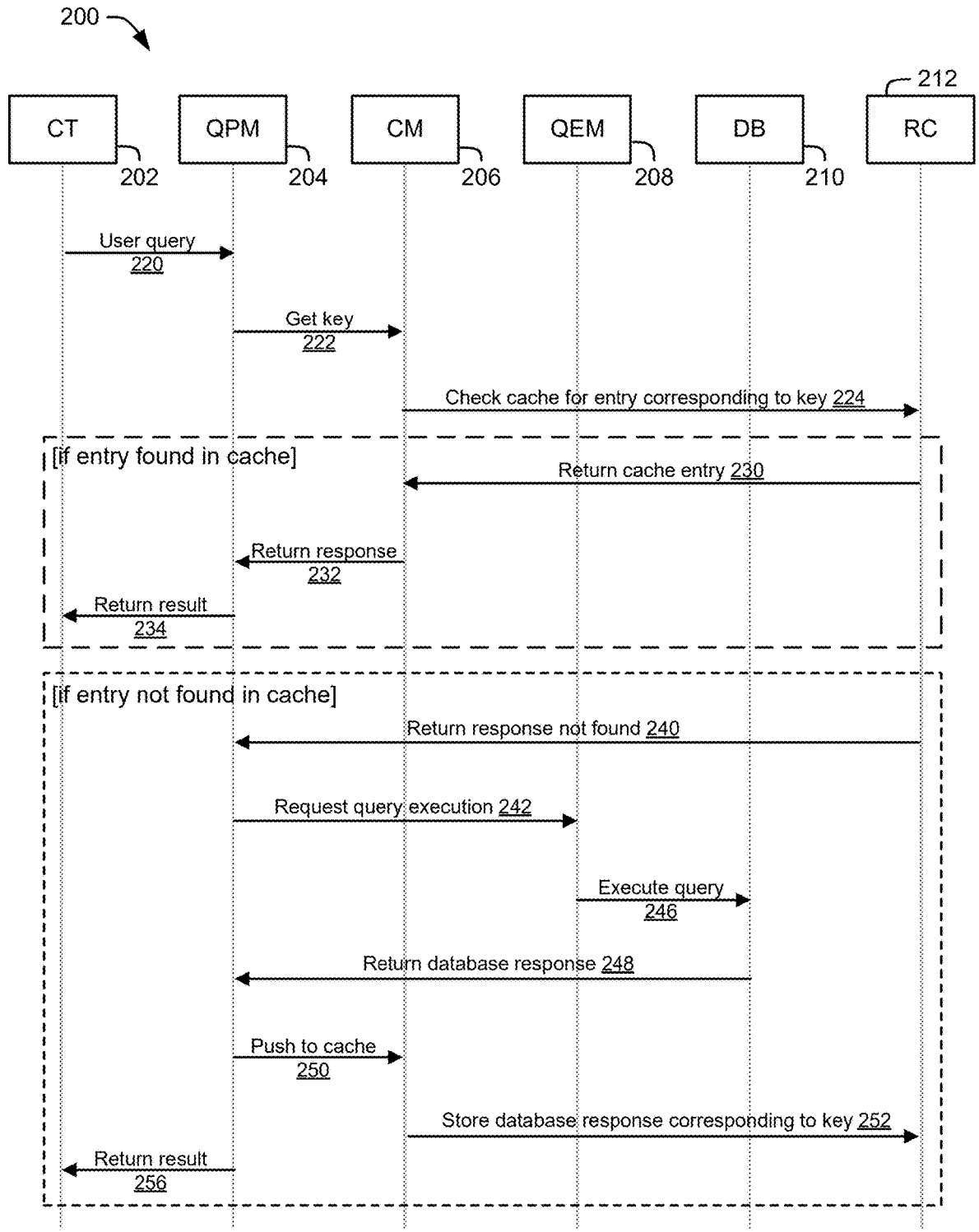
FIG. 2 illustrates a data retrieval sequence, according to at least one embodiment.

FIG. 2 illustrates a data retrieval workflow sequence 200, according to at least one embodiment. In at least one embodiment, a system such as the system described in FIG. 1 (e.g., data retrieval and caching system 100 of FIG. 1) performs the workflow sequence 200 to receive a query and return result data from a cached data table (e.g., request cache 126). In at least one embodiment, workflow sequence 200 obtains and returns data from a database through execution of a database query if data is not found in the cached data table.

In at least one embodiment, workflow sequence 200 indicates various units communicating with each other in order to obtain a result to a data request. In at least one embodiment, the units of workflow sequence 200 comprise a computing terminal (CT) 202 (e.g., computing terminal 130 of FIG. 1), query processing module (QPM) 204 (e.g., query processing module 112), caching module (CM) 206 (e.g., caching module 114), query execution module (QEM) 208 (e.g., query execution module 116), database (DB) 210 (e.g., database 122), and request cache (RC) (e.g., request cache 126.)

In at least one embodiment, a user query 220 is transmitted from CT 202 to QPM 204. User query 220 may be initiated manually by a user or may be initiated in response to a software automation preset to provide information to a user.

In at least one embodiment, QPM 204 generates a unique key corresponding to user query 220 and transmits the unique key 222 to CM 206. CM 206 may then access RC 212 and compares unique key 222 with identifying keys 224 corresponding to entries stored in RC 212.

In at least one embodiment, if the query's unique key matches an key of an entry stored in RC 212 (indicated in FIG. 2 by a dashed box), then it is determined that the RC 212 contains the results to the query 220. Then, RC 212 may return cached results 230 to CM 206, which returns the query response to QPM 232, and finally returns the query response 234 to the user at CT 202, at which point workflow sequence 200 ends.

In at least one embodiment, if the query's unique key does not match any keys of the entries stored in RC 212 (indicated in FIG. 2 by a dotted box), then it is determined that the RC 212 does not contain the results to the query 220. RC 212 may return a response indicating no result found 240 to QPM 204. QPM 204 may then transmit a request for execution of the query 242 at the database to QEM 208. QEM 208 then executes the query command 246 and retrieves the results from database 210. The database results 248 retrieved by QEM 208 are transmitted back to QPM 204. Then, QPM 204 initiates a new entry to the cache by transmitting the database results 248 along with the unique key 250 to CM 206, which stores the information 252 in RC 212 for future retrieval. Finally, a result 256 obtained from database response 248 is transmitted to the user at CT 202, at which point workflow sequence 200 ends.

In at least one embodiment, if the query's unique key does match a key stored in RC 212 but the entry is expired, then the cached entry is not returned and instead follows a similar or same workflow as if the entry were not found in the cache (indicated in FIG. 2 by a dotted box), described above.

In at least one embodiment, performing some or all of the processes of workflow sequence 200 accelerates data retrieval and enables use cases that were not possible before without additional database requests, such as dashboard auto refreshing or data visualization interaction (e.g., forecasting, trendlines, zoom in/out). Performing some or all of the processes of workflow sequence 200 will allow a user to process large requests in the background at the server level, which alleviates the burden on the end-user's system, and to have regularly updated data without manual intervention.

In an embodiment, some or all of workflow sequence 200 (or any other processes described, or variations and/or combinations of those processes) may be performed under the control of one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of workflow sequence 200 may be performed by any suitable system, such as the computing device 600 of FIG. 6.

Figure 3:
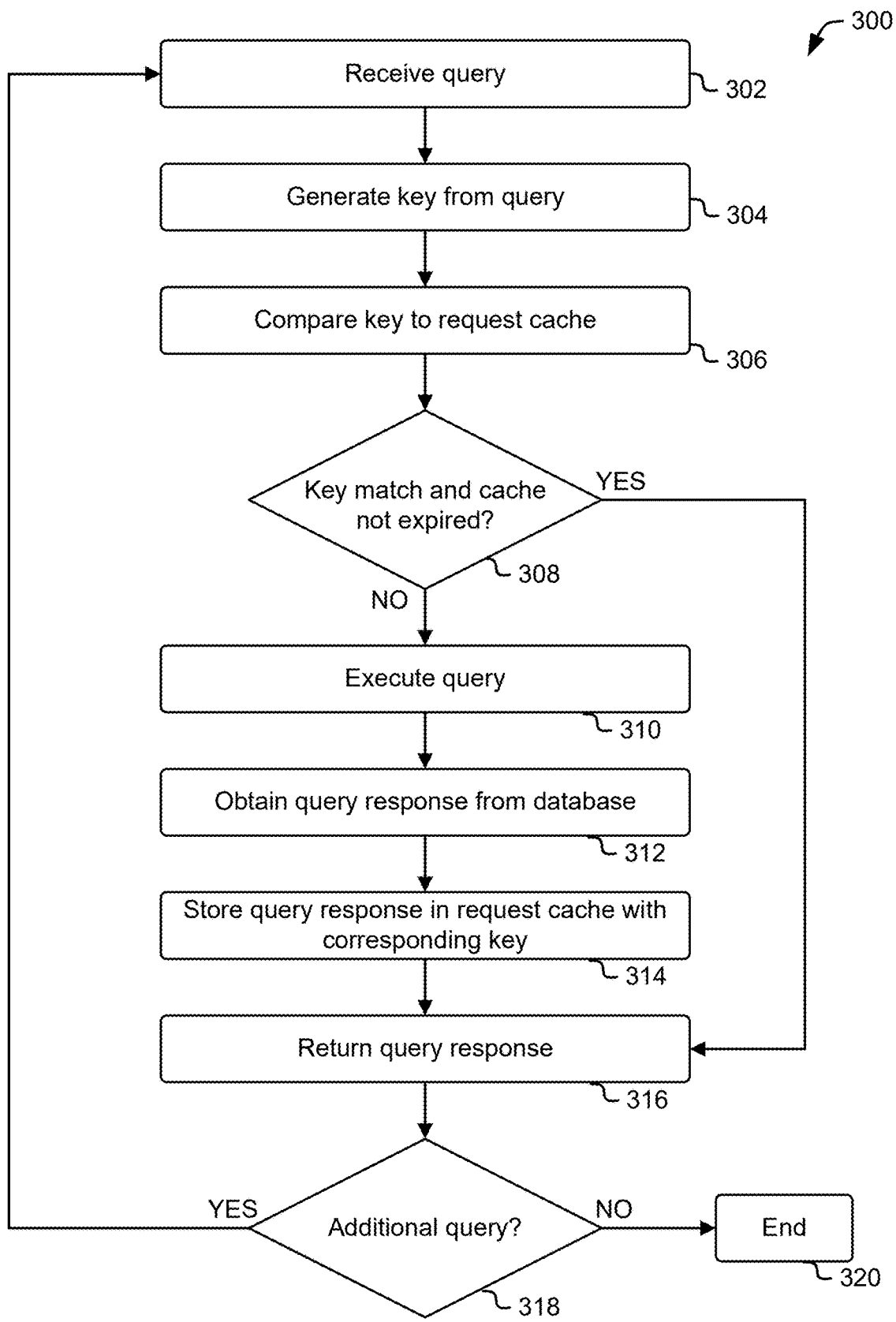
FIG. 3 illustrates a data retrieval and data caching process, according to at least one embodiment.

FIG. 3 illustrates a data retrieval and data caching process 300, according to at least one embodiment. In at least one embodiment, process 300 can be performed by the system in FIG. 1 (e.g., data retrieval and caching system 100) to receive a query and return result data from a cached data table (e.g., request cache 126). In at least one embodiment, workflow sequence 200 obtains and returns data from a database through execution of a database query if data is not found in the cached data table.

In at least one embodiment, at step 302, a processor (e.g., processor 110) receives a database query or database request (e.g., from computing terminal 130). The request may be generated by a user or automation software that automatically presents database results to the user via a GUI. In at least one embodiment, the database query is a batched query comprising a plurality of individual queries for requested information corresponding to a user dashboard.

In at least one embodiment, at step 304, a processor generates a unique key (e.g., using query processing module 112) corresponding to the database query received at step 302. The unique key may be a hashed or encrypted value that is generated by modifying unique properties of the data request and/or resolving specific conditions of the request.

In at least one embodiment, at step 306, a processor (e.g., using caching module 114) compares the unique key generated to keys corresponding to entries of a request cache (e.g., request cache 126). In at least one embodiment, the request cache is a cache memory of a database, where the entries are stored in a data table comprising a plurality of entries and plurality of key values and each entry has a corresponding key value.

In at least one embodiment, at step 308, if the unique key does not match any of the entries of the request cache or if the unique key only matches an expired entry of the request cache (NO at step 308), then it is determined that a new query needs to be executed (or re-executed for an expired entry.) In this case, a new message may be generated for the message queue (e.g., request queue 124) so that the new query can be performed a processing node.

In at least one embodiment, at step 310, the query is executed at a processing node and, at step 312, results are retrieved from the database. In at least one embodiment, at step 314, the query response obtained at step 312 along with the database query and its unique key are stored in a request cache. By storing the information in a request cache, this process enables handling of future data requests without needing a query execution at the database and enables asynchronous query processing, which reduces the computation load on the servers.

In at least one embodiment, at step 308, if the unique key matches an unexpired entry of stored in the request cache (YES at step 308), then it is determined that a new query does not need to be executed. In this case, the query response is retrieved from the request cache entry and the process moves to step 316.

In at least one embodiment, at step 316, the query response obtained at either step 314 or step 308 is returned to the user and is displayed on a computing terminal via a dashboard. In at least one embodiment, at step 318, if additional queries are pending within a batch request or in the request queue (YES at 318), then the process 300 returns to step 302 and repeats as described above; otherwise (NO at 318), process 300 ends at step 320.

In at least one embodiment, performing some or all of the process 300 accelerates data retrieval by the computing terminal because redundant search queries can be eliminated and other search queries can be avoided (e.g., step 308), reducing processing time. Performing some or all of the process 300 can additionally enable smart pre-fetching of data based on usage or on a pre-defined schedule.

In at least one embodiment, implementations herein provide for improving data retrieval for dashboards using data caching. In an embodiment, the process 300 (or any other processes described, or variations and/or combinations of those processes) may be performed under the control of one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 300 may be performed by any suitable system, such as the computing device 600 of FIG. 6. In at least one embodiment, performing workflow sequence 200 of FIG. 2 and/or by performing process 300, more database queries can be handled in parallel and some queries can be handled without execution, thus reducing the load on any individual processing node.

Figure 4:
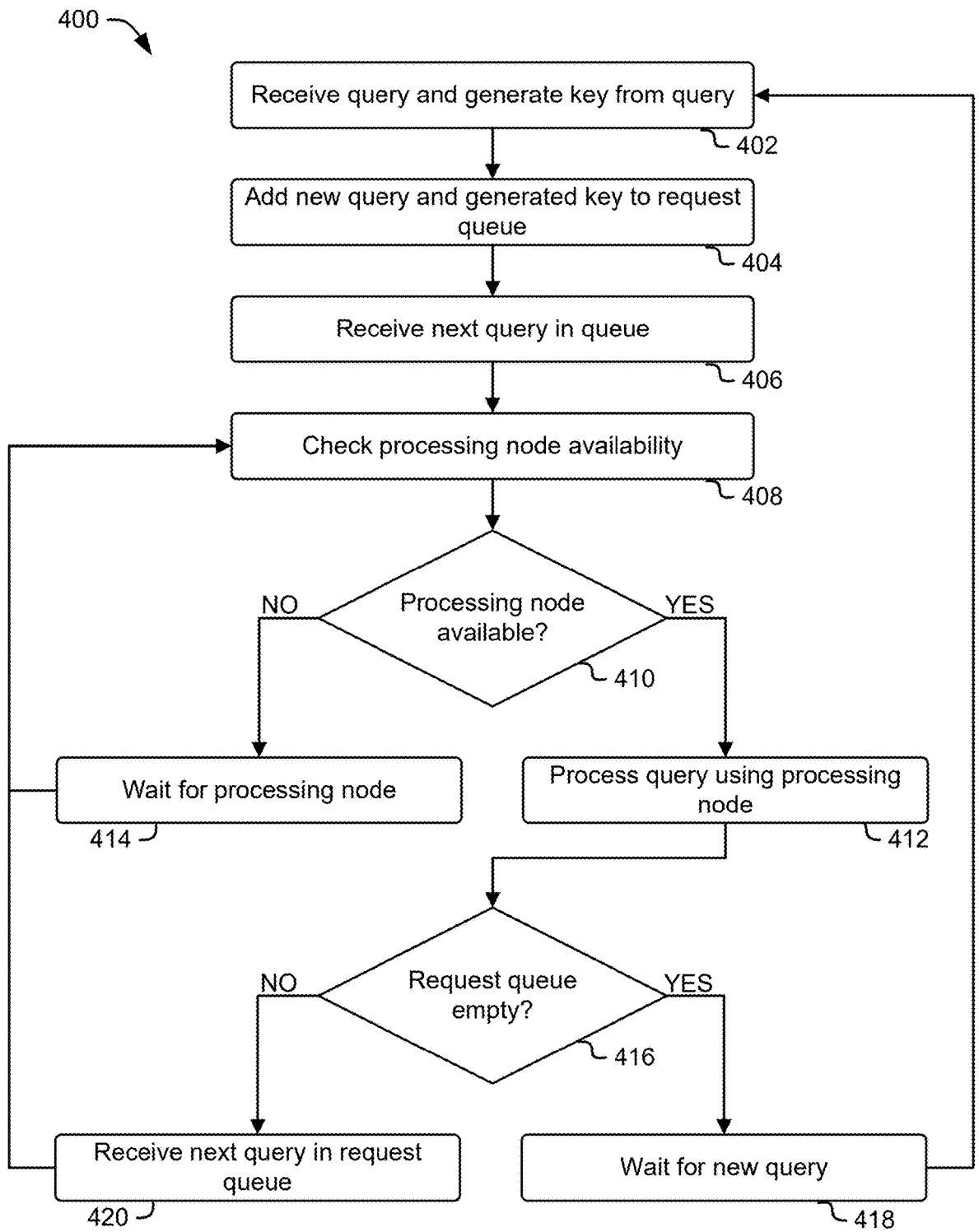
FIG. 4 illustrates a query processing distribution process, according to at least one embodiment.

FIG. 4 illustrates a query processing distribution process 400, according to at least one embodiment. In at least one embodiment, process 400 can be performed by the system in FIG. 1 (e.g., data retrieval and caching system 100) to receive a query and add the query to a queue for execution (e.g., request queue 124). In at least one embodiment, process 400 identifies available processing nodes and proceeds to process the next queued query while other nodes may still be busy.

In at least one embodiment, at step 402, a processor (e.g., processor 110) receives a query from a user or a software automation or dashboard at a computing terminal and generates a key from the query. In at least one embodiment, this query and key are obtained in a similar manner as with respect to steps 302-304 of FIG. 3.

In at least one embodiment, at step 404, a processor adds the new query to the request queue (e.g., request queue 124) for processing. In at least one embodiment, the request queue comprises a message queue (e.g., NowMQ, Hermes, etc.) and adding the new query to the request queue comprises generating a new message and appending it to the message queue. In at least one embodiment, the request queue is ordered in a FIFO manner. In another embodiment, the request queue is ordered in a manner set by predetermined rules (e.g., importance priority).

In at least one embodiment, at step 406, a processor receives the next query in the request queue. The next query may, for example, be the next message in the message queue. In at least one embodiment, at step 408, a processor checks of any processing node of the plurality of processing nodes are available to process the next query.

In at least one embodiment, at step 410, if no processing nodes are available for use (NO at 410), then the process waits for a node to be available at step 414. After some time has elapsed or after a notification that a node is free, the process returns to step 408 to recheck or confirm availability of an available node and repeats.

In at least one embodiment, at step 410, if a processing node is available (YES at 410), then the query in the request queue (e.g., message of message queue) is passed to the available node for processing at step 412. In at least one embodiment, a query command is executed (e.g., as described with reference to FIGS. 2 and 3) to obtain information from a database (e.g., database 122 using query execution module 116.) In at least one embodiment, a query command is not executed and information from a request cache is returned (e.g., request cache 126).

In at least one embodiment, at step 416, if a request queue has not completed all requests in the request queue (NO at 416), then a subsequent query in the queue is retrieved for processing at step 420. At this point, the process then may return to step 410 to distribute the subsequent query to a node in the same manner as described above.

In at least one embodiment, at step 416, if all of the requests of the request queue are complete (YES at 416), then all nodes are freed, where, at step 418, the process 400 may wait until a new query is received. When a new query is received, the process may return to step 402 and proceeds in a same manner as described above.

In at least one embodiment, performing some or all of the process 400 may significantly improve user experience when using dashboards and pages with visualizations due to faster loading of data caused by distributed processing (e.g., steps 410-412). Performing some or all of the process 400 can additionally remove the bottlenecks that impede the perceived performance of apps and complex pages in general because more requests are handled at once. For example, by distributing processing as described herein at the server level, the user can avoid problematic limitations of web browser requests caused when many requests are needed to populate a dashboard.

In an embodiment, the process 400 (or any other processes described, or variations and/or combinations of those processes) may be performed under the control of one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media). For example, the configuration windows and tables of FIG. 4 may be performed by any suitable system, such as the computing device 600 of FIG. 6.

Figure 5:
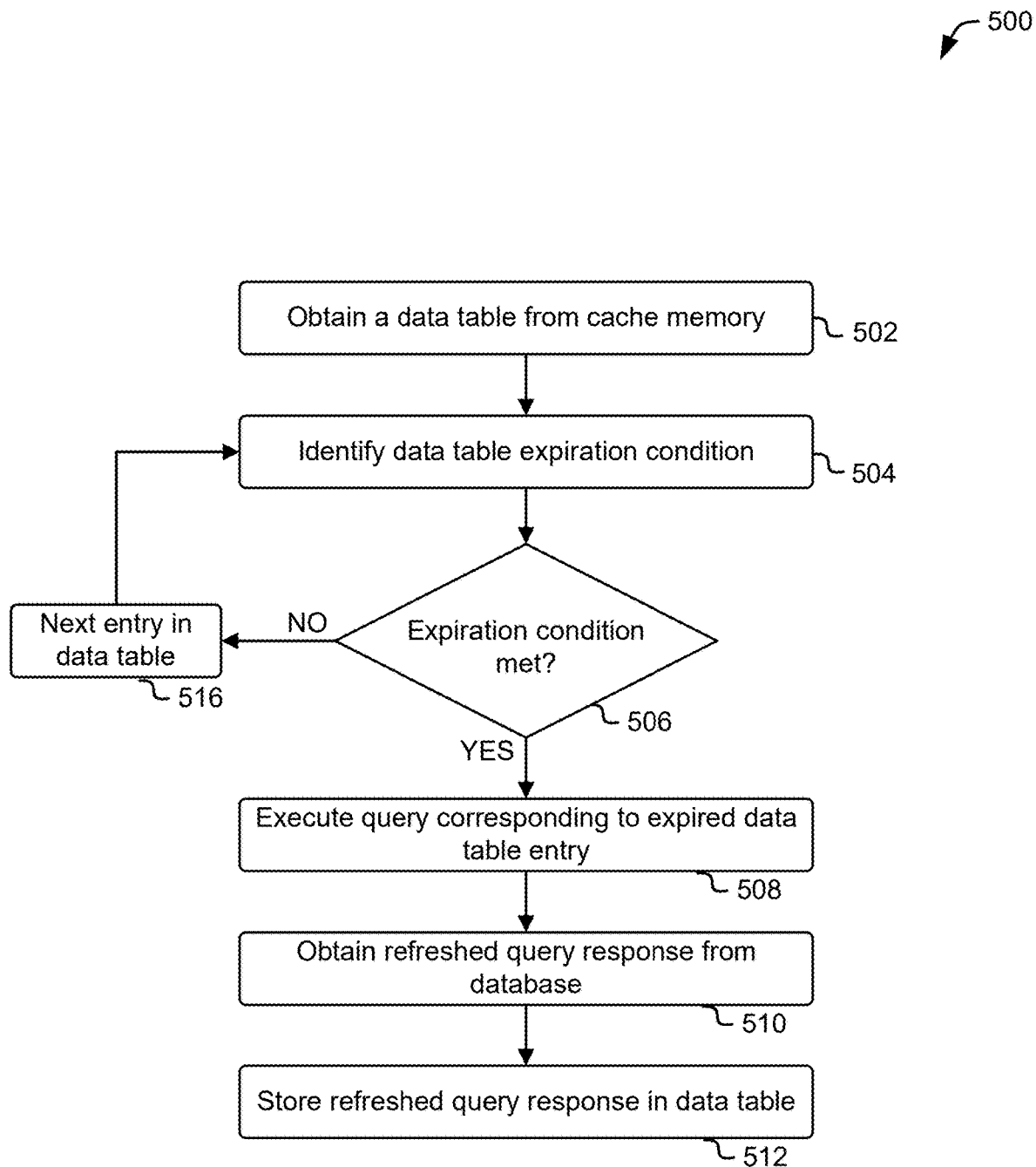
FIG. 5 illustrates a cache refresh process, according to at least one embodiment.

FIG. 5 illustrates a cache refresh process 500. In at least one embodiment, process 500 can be performed by the system in FIG. 1 (e.g., data retrieval and caching system 100) to refresh expired data stored in a request cache (e.g., request cache 126). In at least one embodiment, a processor (e.g., processor 110 of FIG. 1) performs processes 500 to enable asynchronous query processing.

In at least one embodiment, at step 502, a processor (e.g., processor 110 of FIG. 1) using a module (e.g., caching module 114) obtains a data table from cache memory (e.g., request cache 126.) The data table may comprise previously-executed data queries, results generated from the previously-executed data queries, an data expiration conditions for each previously-executed data query, and a key values corresponding to the previously-executed data queries.

In at least one embodiment, at step 504, a processor retrieves an entry in the data table obtained at step 502 and identifies the expiration condition corresponding to the entry. An expiration condition may be a user-configurable parameter based on a predetermined date and time, a duration, a frequency at which the data table is accessed (e.g., caching statistics), recent logins or dashboard updates, a manual request, or any other parameter appropriate to the database and data being accessed.

In at least one embodiment, at step 506, a processor determines whether an expiration condition of a given entry in the data table has been met or exceeded. For example, if the preset expiration condition is a time duration (e.g., 3 hours), then the processor determines whether 3 hours have elapsed since the data was stored in the cache memory.

In at least one embodiment, if the expiration condition has not been met (NO at 506), then it is determined that the data entry in the data table is not expired/stale and is left unchanged. Process 500 may then move to a subsequent entry in the data table at step 516, where the process repeats beginning at step 504 using the subsequent entry.

In at least one embodiment, if the expiration condition has been met or exceeded (YES at 506), then it is determined that the data entry is expired. In at least one embodiment, at step 508, the processor executes the query (e.g., using query execution module 116) stored in or corresponding to the cache entry.

In at least one embodiment, at step 510, a resulting response generated from the executed query at step 508 is retrieved from the database to refresh (or hydrate) the cache.

In at least one embodiment, at step 512, the response is stored in the data table as a refreshed data table entry with an updated expiration condition (e.g., an updated expiration time).

In at least one embodiment, performing some or all of the process 500 may significantly improve user experience by maintaining a regular hydration of dashboard information without requiring manual intervention (e.g., step 510). Performing some or all of the process 500 can additionally enable insight for a particular client or user regarding volatility or fluctuation of a tracked value or dashboard visualization by identifying average expiration times of a given data request (e.g., step 506).

In an embodiment, some or all of process 500 (or any other processes described, or variations and/or combinations of those processes) may be performed under the control of one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 500 may be performed by any suitable system, such as the computing device 600 of FIG. 6. Additionally, although process 500 discloses a updating or refreshing of the data table in the cache memory, the expired data entry may be removed from the data table entirely in an alternative embodiment, according to the predetermined expiration conditions.

Figure 6:
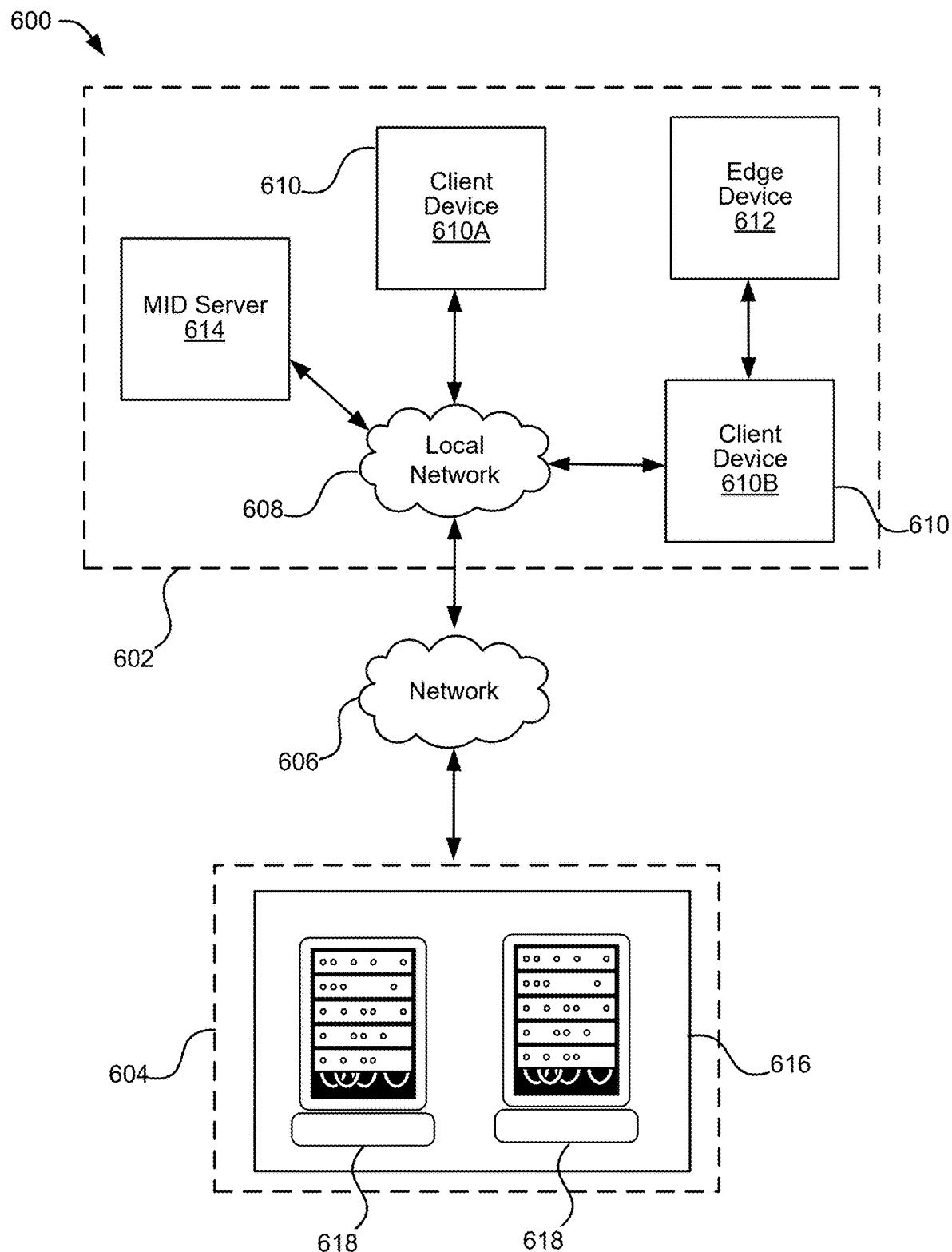
FIG. 6 illustrates a system in which various embodiments can be implemented.

FIG. 6 illustrates a system 600 in which various embodiments can be implemented. The system 600 may include a client network 602 and a provider platform 604 that are operably connected via a network 606 (e.g., the Internet). In an embodiment, the client network 602 may be a private local network 608, such as a local area network (LAN) that includes a variety of network devices that include, but are not limited to, switches, servers, and routers. In an embodiment, the client network 602 can comprise an enterprise network that can include one or more LANs, virtual networks, data centers, and/or other remote networks. In an embodiment, the client network 602 can be operably connected to one or more client devices 610 such as example client device 610A, 610B so that the client devices 610 are able to communicate with each other and/or with the provider platform 604. In an embodiment, the client devices 610 can be computing systems and/or other types of computing devices generally referred to as Internet of Things (IoT) devices that can access cloud computing services, for example, via a web browser application or via an edge device 612 that may act as a gateway between one or more client devices 610 and the platform 604 (e.g., second client device 610B). In an embodiment, the client network 602 can include a management, instrumentation, and discovery (MID) server 614 that facilitates communication of data between the network hosting the platform 604, other external applications, data sources, and services, and the client network 602. In an embodiment, the client network 602 may also include a connecting network device (e.g., a gateway or router) or a combination of devices that implement a customer firewall or intrusion protection system.

In an embodiment, the client network 602 can be operably coupled to the network 606, which may include one or more suitable computing networks, such a large area network (LAN), wide area networks (WAN), the Internet, and/or other remote networks, that are operable to transfer data between the client devices 610 and the provider platform

604. In an embodiment, one or more computing networks within network 606 can comprise wired and/or wireless programmable devices that operate in the electrical and/or optical domain. For example, network 606 may include wireless networks, such as cellular networks (e.g., Global System for Mobile Communications (GSM) based cellular network), WIN networks, and/or other suitable radio-based networks. The network 606 may also employ any suitable network communication protocols, such as Transmission Control Protocol (TCP), Internet Protocol (IP), and the like. In an embodiment, network 606 may include a variety of network devices, such as servers, routers, network switches, and/or other suitable network hardware devices configured to transport data over the network 606.

In an embodiment, the provider platform 604 may be a remote network (e.g., a cloud network) that is able to communicate with the client devices 610 via the client network 602 and network 606. In an embodiment, the provider platform 604 can comprise a configuration management database (CMDB) platform. In an embodiment, the provider platform 604 provides additional computing resources to the client devices 610 and/or the client network 602. For example, by utilizing the provider platform 604, in some examples, users of the client devices 610 can build and execute applications for various enterprise, IT, and/or other organization-related functions. In one embodiment, the provider platform 604 can be implemented on the one or more data centers 616, where each data center 616 can correspond to a different geographic location in some examples. In an embodiment, one or more the data centers 616 includes a plurality of servers 618 (also referred to in some examples as application nodes, virtual servers, application servers, virtual server instances, application instances, application server instances, or the like), where each server 618 can be implemented on a physical computing system, such as a single electronic computing device (e.g., a single physical hardware server) or across multiple-computing devices (e.g., multiple physical hardware servers). Examples of servers 618 can include a virtual server, a web server (e.g., a unitary Apache installation), an application server (e.g., a unitary Java Virtual Computer), and/or a database server.

To utilize computing resources within the provider platform 604, in an embodiment, network operators may choose to configure the data centers 616 using a variety of computing infrastructures. In an embodiment, one or more of the data centers 616 can be configured using a multi-instance cloud architecture to provide every customer with its own unique customer instance or instances. For example, a multi-instance cloud architecture of some embodiments can provide each customer instance with its own dedicated application server and dedicated database server. In some examples, the multi-instance cloud architecture could deploy a single physical or virtual server 618 and/or other combinations of physical and/or virtual servers 618, such as one or more dedicated web servers, one or more dedicated application servers, and one or more database servers, for each customer instance. In an embodiment of a multi-instance cloud architecture, multiple customer instances can be installed on one or more respective hardware servers, where each customer instance is allocated certain portions of the physical server resources, such as computing memory, storage, and processing power. By doing so, in some examples each customer instance has its own unique software stack that provides the benefit of data isolation, relatively less downtime for customers to access the platform 604, and customer-driven upgrade schedules.

In some embodiments, the provider platform 604 includes a computer-generated data management server that receives, via network 606 and/or an internal network within or across different data centers, computer-generated data for storage and analysis. For example, log entries can be sent from client devices/servers 610, MID server 614 (e.g., agent server acting as the intermediary in client network 602 to facilitate access to client network 602 by the network hosting the platform 604), and/or servers in data centers 616 to a log management server in data centers 616.

Although FIG. 6 illustrates a specific embodiment of a cloud computing system 600, the disclosure is not limited to the specific embodiments illustrated in FIG. 6. For instance, although FIG. 6 illustrates that the platform 604 is implemented using data centers, other embodiments of the platform 604 are not limited to data centers and can utilize other types of remote network infrastructures. Some embodiments may combine one or more different virtual servers into a single virtual server. The use and discussion of FIG. 6 are only examples to facilitate ease of description and explanation and are not intended to limit the disclosure to the specific examples illustrated therein. In an embodiment, the respective architectures and frameworks discussed with respect to FIG. 6 can incorporate suitable computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UPnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C # or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

One aspect of the disclosure includes a method for identifying data access in a data table and generating an access policy to the data table. The method may include obtaining, from a cache memory of database, a data table comprising a plurality of entries and a plurality of key values, each entry of the data table comprising a respective key value. The method may further include receiving a first query for data from the database and generating, based on the first query, a first key. The method may further include determining that the first key does not match any key value of the plurality of key values of the data table. The method may further include executing, at the database, the first query to obtain first query results and storing the first query results at the data table along with the first key value. The method may further include applying the first access policy and the second access policy receiving a second query for data from the database; generating, based on the second query, a second key; determining that the second key matches a particular key value of the data table; and in response to determining that the second key matches the particular key value of the data table, returning, as second key results to the second query, the corresponding entry of the data table associated with the particular key value.

Implementations of the disclosure may include one or more of the following features. The method may include processing the first query at a first processing node; and processing the second query at a second processing node. The method may include adding the first query to a request queue before determining that the first key does not match any key value of the plurality of key values of the data table; and adding the second query to the request queue before determining that the second key matches a particular key value of the data table. The method may further indicate that determining that the second key matches a particular key value of the data table further comprises determining that an expiration condition of the data table is satisfied. The method may further indicate that executing the first query to obtain first query results comprises processing the first query at a first processing node while concurrently processing a third query to obtain third query results at a second processing node. The method may further include returning, as first key results to the first query, the first query results, wherein at least one of the first key results the second key results are returned asynchronously. The method may further indicate that at least one of the first query and the second query are batched queries comprising a plurality of queries corresponding to a dashboard graphical user interface (GUI) of a user. The method may further indicate the second key results are used to generate a data visualization shown on a dashboard to a user. The method may further include using a query execution module of the one or more processors to obtain the first query results. The method may further include storing the first query and the second query in a request queue. The method may further include returning, as first key results to the first query, the first query results. The method may further be performed by a server of a data center. The method may further include obtaining an expiration condition for each entry of the data table; determining that the corresponding entry of the data table associated with the particular key value is expired based, at least in part, on the expiration condition; and in response to determining that the corresponding entry has expired, executing, at the database, the second query to obtain second query results, replacing the corresponding entry with the second query results and an updated expiration condition, and returning, as second key results to the second query, the second query results. The method may further include, in response to determining that first key does match a key value of the plurality of the key values of the data table, returning, as first key results to the first query, the entry corresponding to the key value. The method may further indicate the first query and the second query are processed at different processing nodes of the computer system concurrently. The method may further indicate the particular key value of the data table that matches the second key is the first key value. The method may further indicate each entry of the data table further comprises respective query information, respective result information, and a respective expiration condition. The method may further indicate each entry of the data table further comprises an user-configurable expiration condition based, at least in part, on a predetermined date, a time duration, caching statistics, or a manual request.

Another aspect of the disclosure includes a system comprising one or more processors and a memory including computer-executable instructions. The one or more processors, when executing the computer-executable instructions, may cause the system to obtain, from a cache memory of database, a data table comprising a plurality of entries and a plurality of key values, each entry of the data table comprising a respective key value. The one or more processors may further cause the system to receive a first query for data from the database, generate, based on the first query, a first key, and determine that the first key does not match any key value of the plurality of key values of the data table. The one or more processors may further cause the system to execute, at the database, the first query to obtain first query results and store the first query results at the data table along with the first key value. The one or more processors may further cause the system to receive a second query for data from the database, generate, based on the second query, a second key, and determine that the second key matches a particular key value of the data table. The one or more processors may further cause the system to, in response to determining that the second key matches the particular key value of the data table, return, as second key results to the second query, the corresponding entry of the data table associated with the particular key value.

Implementations of the disclosure may include one or more of the following features. The one or more processors may further cause the system to process the first query at a first processing node; and process the second query at a second processing node. The one or more processors may further cause the system to add the first query to a request queue before determining that the first key does not match any key value of the plurality of key values of the data table; and add the second query to the request queue before determining that the second key matches a particular key value of the data table. The one or more processors may further cause the system to indicate that determining that the second key matches a particular key value of the data table further comprises determining that an expiration condition of the data table is satisfied. The one or more processors may further cause the system to indicate that executing the first query to obtain first query results comprises processing the first query at a first processing node while concurrently processing a third query to obtain third query results at a second processing node. The one or more processors may further cause the system to return, as first key results to the first query, the first query results, wherein at least one of the first key results the second key results are returned asynchronously. The one or more processors may further cause the system to indicate that at least one of the first query and the second query are batched queries comprising a plurality of queries corresponding to a dashboard graphical user interface (GUI) of a user. The one or more processors may further cause the system to indicate the second key results are used to generate a data visualization shown on a dashboard to a user. The one or more processors may further cause the system to use a query execution module of the one or more processors to obtain the first query results. The one or more processors may further cause the system to store the first query and the second query in a request queue. The one or more processors may further cause the system to return, as first key results to the first query, the first query results. The one or more processors may be a part of a server of a data center. The one or more processors may further cause the system to obtain an expiration condition for each entry of the data table; determine that the corresponding entry of the data table associated with the particular key value is expired based, at least in part, on the expiration condition; and in response to determining that the corresponding entry has expired, execute, at the database, the second query to obtain second query results, replace the corresponding entry with the second query results and an updated expiration condition, and return, as second key results to the second query, the second query results. The one or more processors may further cause the system to, in response to determining that first key does match a key value of the plurality of the key values of the data table, return, as first key results to the first query, the entry corresponding to the key value. The one or more processors may further cause the system to indicate the first query and the second query are processed at different processing nodes of the computer system concurrently. The one or more processors may further cause the system to indicate the particular key value of the data table that matches the second key is the first key value. The one or more processors may further cause the system to indicate each entry of the data table further comprises respective query information, respective result information, and a respective expiration condition. The one or more processors may further cause the system to indicate each entry of the data table further comprises an user-configurable expiration condition based, at least in part, on a predetermined date, a time duration, caching statistics, or a manual request.

Another aspect of the disclosure includes a non-transitory computer-readable storage medium having stored thereon executable instructions that are executable by one or more processors of a computer system. The computer-readable storage medium may include instructions to obtain, from a cache memory of database, a data table comprising a plurality of entries and a plurality of key values, each entry of the data table comprising a respective key value. The computer-readable storage medium may include instructions to receive a first query for data from the database, generate, based on the first query, a first key, and determine that the first key does not match any key value of the plurality of key values of the data table. The computer-readable storage medium may include instructions to execute, at the database, the first query to obtain first query results and store the first query results at the data table along with the first key value. The computer-readable storage medium may include instructions to receive a second query for data from the database, generate, based on the second query, a second key, and determine that the second key matches a particular key value of the data table. The computer-readable storage medium may include instructions to, in response to determining that the second key matches the particular key value of the data table, return, as second key results to the second query, the corresponding entry of the data table associated with the particular key value.

Implementations of the disclosure may include one or more of the following features. The computer-readable storage medium may include instructions to process the first query at a first processing node; and process the second query at a second processing node. The computer-readable storage medium may include instructions to add the first query to a request queue before determining that the first key does not match any key value of the plurality of key values of the data table; and add the second query to the request queue before determining that the second key matches a particular key value of the data table. The computer-readable storage medium may include instructions to indicate that determining that the second key matches a particular key value of the data table further comprises determining that an expiration condition of the data table is satisfied. The computer-readable storage medium may include instructions to indicate that executing the first query to obtain first query results comprises processing the first query at a first processing node while concurrently processing a third query to obtain third query results at a second processing node. The computer-readable storage medium may include instructions to return, as first key results to the first query, the first query results, wherein at least one of the first key results the second key results are returned asynchronously. The computer-readable storage medium may include instructions to indicate that at least one of the first query and the second query are batched queries comprising a plurality of queries corresponding to a dashboard graphical user interface (GUI) of a user. The computer-readable storage medium may include instructions to indicate the second key results are used to generate a data visualization shown on a dashboard to a user. The computer-readable storage medium may include instructions to use a query execution module of the one or more processors to obtain the first query results. The computer-readable storage medium may include instructions to store the first query and the second query in a request queue. The computer-readable storage medium may include instructions to return, as first key results to the first query, the first query results. The one or more processors may be a part of a server of a data center. The computer-readable storage medium may include instructions to obtain an expiration condition for each entry of the data table; determine that the corresponding entry of the data table associated with the particular key value is expired based, at least in part, on the expiration condition; and in response to determining that the corresponding entry has expired, execute, at the database, the second query to obtain second query results, replace the corresponding entry with the second query results and an updated expiration condition, and return, as second key results to the second query, the second query results. The computer-readable storage medium may include instructions to, in response to determining that first key does match a key value of the plurality of the key values of the data table, return, as first key results to the first query, the entry corresponding to the key value. The computer-readable storage medium may include instructions to indicate the first query and the second query are processed at different processing nodes of the computer system concurrently. The computer-readable storage medium may include instructions to indicate the particular key value of the data table that matches the second key is the first key value. The computer-readable storage medium may include instructions to indicate each entry of the data table further comprises respective query information, respective result information, and a respective expiration condition. The computer-readable storage medium may include instructions to indicate each entry of the data table further comprises an user-configurable expiration condition based, at least in part, on a predetermined date, a time duration, caching statistics, or a manual request.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—For example, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method executed by data processing hardware that causes the data processing hardware to perform operations comprising:
 obtaining, from a cache memory of database, a data table comprising a plurality of entries and a plurality of keys, each entry of the data table comprising a respective key;
 receiving a first query for data from the database;
 generating, based on the first query, a first key;
 determining that the first key does not match any key of the plurality of keys of the data table in the cache memory;

executing, at the database, the first query to obtain first query results;
storing the first query results at the data table in the cache memory along with the first key;
returning, as first key results to the first query, the first query results;
receiving a second query for data from the database;
generating, based on the second query, a second key;
determining that the second key matches the first key of the data table in the cache memory; and
in response to determining that the second key matches the first key of the data table in the cache memory, returning, as second key results to the second query, the first query results.

2. The method of claim 1, further comprising:
processing the first query at a first processing node; and
processing the second query at a second processing node.

3. The method of claim 1, further comprising:
adding the first query to a request queue before determining that the first key does not match any key of the plurality of keys of the data table in the cache memory; and
adding the second query to the request queue before determining that the second key matches the first key of the data table in the cache memory.

4. The method of claim 1, wherein determining that the second key matches the first key of the data table in the cache memory further comprises determining that an expiration condition of the data table is satisfied.

5. The method of claim 1, wherein executing the first query to obtain first query results comprises processing the first query at a first processing node while concurrently processing a third query to obtain third query results at a second processing node.

6. The method of claim 1,
wherein at least one of the first key results and the second key results are returned asynchronously.

7. The method of claim 1, wherein at least one of the first query and the second query are batched queries comprising a plurality of queries corresponding to a dashboard graphical user interface (GUI) of a user.

8. The method of claim 1, comprising applying a first access policy to the data table in the cache memory prior to responding to the second query.

9. The method of claim 1, comprising determining that a user-configurable expiration condition associated with the matching entry is not satisfied.

10. A system, comprising:
one or more processors; and
memory including computer-executable instructions that, if executed by the one or more processors, cause the system to:
obtain, from a cache memory of database, a data table comprising a plurality of entries and a plurality of keys, each entry of the data table comprising a respective key;
receive a first query for data from the database;
generate, based on the first query, a first key;
determine that the first key does not match any key of the plurality of keys of the data table in the cache memory;
execute, at the database, the first query to obtain first query results;
store the first query results at the data table in the cache memory along with the first key;
return, as first key results to the first query, the first query results;
receive a second query for data from the database;
generate, based on the second query, a second key;
determine that the second key matches the first key of the data table in the cache memory; and
in response to determining that the second key matches the first key of the data table in the cache memory, return, as second key results to the second query, the first query results.

11. The system of claim 10, wherein the second key results are used to generate a data visualization shown on a dashboard to a user.

12. The system of claim 10, wherein the first query results are obtained using a query execution module of the one or more processors.

13. The system of claim 10, wherein the one or more processors are further configured to store the first query and the second query in a request queue.

14. The system of claim 10, wherein the system is a server of data center.

15. The system of claim 10, wherein the one or more processors are further configured to:
obtain an expiration condition for each entry of the data table in the cache memory;
determine that the corresponding entry of the data table in the cache memory associated with the first key is expired based, at least in part, on the expiration condition; and
in response to determining that the corresponding entry has expired:
execute, at the database, the second query to obtain second query results;
replace the corresponding entry with the second query results and an updated expiration condition; and
return, as second key results to the second query, the second query results.

16. A non-transitory computer-readable storage medium having stored thereon executable instructions which, when executed by one or more processors of a computer system, cause the computer system to:
obtain, from a cache memory of database, a data table comprising a plurality of entries and a plurality of keys, each entry of the data table comprising a respective key;
receive a first query for data from the database;
generate, based on the first query, a first key;
determine that the first key does not match any key of the plurality of keys of the data table in the cache memory;
execute, at the database, the first query to obtain first query results;
store the first query results at the data table in the cache memory along with the first key;
return, as first key results to the first query, the first query results;
receive a second query for data from the database;
generate, based on the second query, a second key;
determine that the second key matches the first key of the data table in the cache memory; and
in response to determining that the second key matches the first key of the data table in the cache memory, return, as second key results to the second query, the first query results.

17. The non-transitory computer-readable storage medium of claim 16, wherein the first query and the second query are processed at different processing nodes of the computer system concurrently.

18. The non-transitory computer-readable storage medium of claim 16, wherein each entry of the data table in the cache memory further comprises respective query information, respective result information, and a respective expiration condition.

19. The non-transitory computer-readable storage medium of claim 16, wherein each entry of the data table in the cache memory further comprises a user-configurable expiration condition based, at least in part, on a predetermined date, a time duration, caching statistics, or a manual request.

* * * * *